April 24, 1962 — A. PITNER — 3,031,239
ROLLER OR NEEDLE THRUST BEARINGS
Filed Jan. 10, 1961
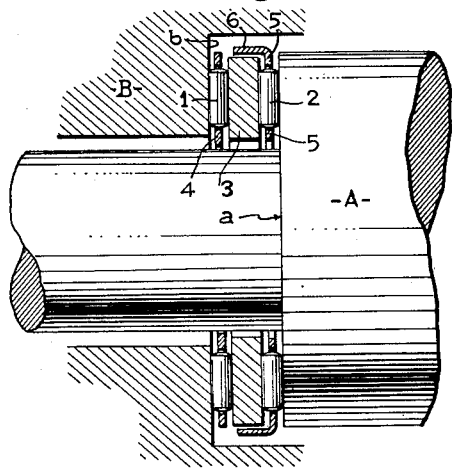
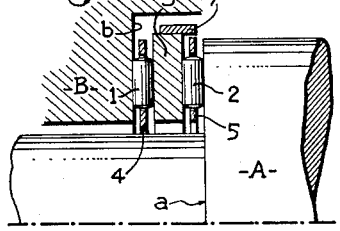 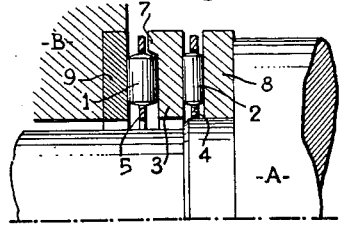
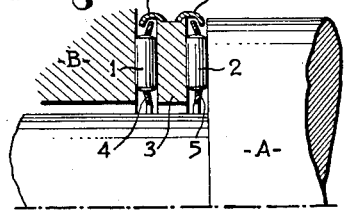 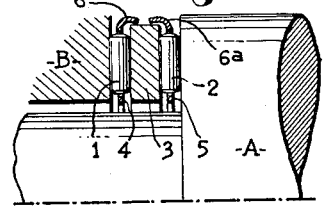
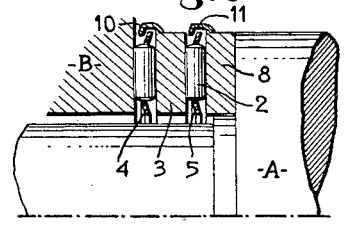

United States Patent Office 3,031,239
Patented Apr. 24, 1962

3,031,239
ROLLER OR NEEDLE THRUST BEARINGS
Alfred Pitner, Paris, France, assignor to Societe Anonyme des Roulements a Aiguilles, Rueil-Malmaison, France, a French body corporate
Filed Jan. 10, 1961, Ser. No. 81,757
Claims priority, application France Jan. 13, 1960
6 Claims. (Cl. 308—235)

The present invention relates to thrust-bearings comprising rollers or needles mounted in a cage or retainer and moving on raceways constituted by plane surfaces at right angles to the axis of the bearing (or by surfaces which are very slightly curved in a radial direction along their circumference of contact with the central portions of the rollers or needles), the assembly being such that the said rollers or needles are free to center themselves in the radial direction.

This type of thrust-bearing enables a great precision of assembly and operation and efficiently withstands axial loads and impacts, provided that the relative speed of one of the raceways with respect to the other does not exceed a certain limit, which is lower when the axial load is greater.

It has been proposed to raise the maximum permissible speed by providing a double thrust-bearing, i.e. by interposing between the raceways which are respectively associated with the rotating part and the fixed support, two transverse rows of rollers or needles, each row being mounted in a cage or retainer, said rows of roller elements being separated by an annular member, the opposite faces of which constitute intermediate raceways. In a double thrust-bearing of this type, the annular member rotates at substantially one half the speed of the rotating part, and the speeds of rotation of the rollers or needles about their own axes and about the bearing axis are thus reduced in the same proportion.

However, the construction of such an assembly offers difficulties to which no satisfactory remedy has yet been found. In particular, it is important that the intermediate annular member should be held radially and that the intermediate raceways formed on said intermediate annular member should be correctly centered with respect to both series of rollers or needles. An evident solution would be to center said annular member either with respect to the rotating part or with respect to the fixed support, but this would mean a harmful contact in operation between said annular member and the fixed or rotating member on which said annular member is centered.

Now, applicant has discovered that it is possible to ensure an effective radial centering of said intermediate member, without the drawbacks referred to above, if, for centering purposes, said intermediate annular member is supported by the cage or retainer containing one of the series of rollers or needles, or preferably by both cages.

Experience has shown that, in single roller or needle thrust-bearings, the row of rollers or needles and the cage retaining these latter exhibit in service the property of self-centering and applicants discovered that this self-centering effect was powerful enough to ensure centering of the intermediate member in a double thrust-bearing.

Therefore, the present invention essentially consists in a double thrust-bearing wherein the intermediate member is mounted freely or in a "floating" manner and is centered with respect to one or both of the rows of roller elements.

It will be easily understood that such a method of self-centering does away with the serious difficulty of positively centering the intermediate member with respect to the rotating part or the fixed support therefor, since the centering member (i.e. one of the rows of roller elements, and preferably the cage therefor) is itself mounted freely or in a floating manner and consequently the pressure of contact between the centering member and the centered member can never exceed a limit which depends on the intensity of the self-centering effect. The self-centering force can be momentarily exceeded, in which case the centering member momentarily yields to the pressure, but it nevertheless exerts a radial biasing thrust, which tends to ensure centering of the intermediate member, before said pressure becomes excessive.

Under the effect of this very flexible biasing effect, self-centering of the cage and of the intermediate member takes place quite rapidly, without setting up dangerous pressures or stresses, and even less by the fact that the relative speed of the centering member (cage) with respect to the centered member (intermediate member) is equal to the speed of rotation of the rollers or needles about the axis of the bearing, i.e. substantially one half the relative speed of the intermediate member with respect to the rotating part (shaft) and to the fixed part (shaft support).

Further characteristic features will be apparent in the following description, with reference to the accompanying drawings, which are given solely by way of example, and in which:

FIG. 1 is a diametrical cross-section of a double-thrust-bearing in accordance with the invention, and FIGS. 2 to 6 are diametrical half-cross-sections of various modifications.

With reference to FIG. 1, A denotes a rotating part such as a shaft, pivoted in a fixed support B, by means of a centering bearing (not shown). Shaft A has a shoulder $a$ and support B a shoulder $b$, the radial faces of which constitute raceways for two rows of rollers or needles 1 and 2, on both sides of an intermediate annular member 3, which is mounted freely or in a floating manner on shaft A. The roller elements 1 and 2 are retained respectively in the cages or retaining grids 4 and 5.

In accordance with the present invention, intermediate member 3 is centered with a pre-determined limited clearance with respect to one or both of the cages 4 and 5. In the example of FIG. 1, cage 5 has a lateral extension 6 in the form of a solid of revolution, surrounding member 3 with a small clearance.

In operation, cages 4 and 5 are subjected to a self-centering effect, which is made available to centre the intermediate member 3, as explained above.

In the example of FIG. 2, the intermediate member 3 is integral with a flange in the form of a solid of revolution 7 which surrounds with a small clearance one of the cages such as 5.

In the example of FIG. 3, flange 7 is formed by machining the intermediate member 3 and centering is made by direct contact thereof with the roller elements 2. Furthermore, the raceways $a$ and $b$ are formed on race plates or rings 8 and 9 which bear against the shoulders of shaft A and support B.

In the example of FIG. 4, intermediate member 3 is integral with two members in the shape of solids of revolution 7, 7$^a$, which surround respectively cages 4 and 5 with a small clearance, whereby intermediate member 3 is subjected to the self-centering effect of both cages.

In the example of FIG. 5, each of the cages 4 and 5 is provided with a flange in the shape of a solid of revolution 6—6$^a$, surrounding with a small clearance intermediate member 3: in this case again, the self-centering effects of both cages is made available.

The flanges in the form of solids of revolution such as 6, 6ª, 7, 7ª, can either be arranged outwardly with respect to the rows of rolling elements, as illustrated in the drawings, or they can be arranged inwardly, although this latter arrangement is less favourable to the lubrication of the needles or rollers. Said flanges can be cylindrical as shown in FIGS. 1 to 3, but, as illustrated in FIGS. 4 to 6, they preferably consist of outwardly arranged, trough-like structures, the inside of the trough facing the axis of the thrust-bearing, so as to retain therein, under the action of centrifugal force, a layer of lubricant, interposed between the centering member and the centered member, thereby effecting a good lubrication of the surfaces adapted to come into contact. Under the effect of the centrifugal force, the layer of lubricant is imparted a kind of rigidity, or resistance to the penetration into the lubricant, of the rim of the member to be centered; the layer of lubricant thus acts as a kind of centering ring, comparable to an elastic mattress, to prevent direct contact between the centering member and the member to be centered; referring for example to FIG. 4, a tendency of the outer rim of cages 4 and 5 to get excentered would meet with appreciable resistance to its penetration into the ring of lubricant contained in the channels of the flanges 7, 7ª.

In the example of FIG. 6, the self-centering effect of cage 4, the rim of which faces a ring of lubricant retained by centrifugal force in a toric portion 10 rigidly fixed to intermediate ring 3, cooperates with the self-centering effect of cage 5, the rim of which faces a ring of lubricant retained by centrifugal force inside a toric portion 11 integral with the member 8.

It will be seen that the above arrangements automatically ensure the centering of all the elements which are mounted in a floating manner about the axis of rotation, and that if any contacts occur between the centering members and the centered members, they are of a transitory nature, taking place under limited pressure and at low speed. Each element of the unit as a whole is therefore subjected to stresses which are practically identical to those of a single thrust-bearing working at approximately one half the speed of the rotating parts in the double bearing.

It will be understood that the thrust-bearing in accordance with the present invention can be interposed not only between a rotating part and a fixed support, but also between two rotating parts having different speeds.

In a general manner, the invention is not limited to the embodiments illustrated and described, which have been given solely by way of example.

Having now described my invention what I claim as new and desire to secure by Letters Patent is:

1. A thrust bearing comprising in combination a structural member, a rotary member, an intermediate member, two rows of radially arranged rolling elements of substantially cylindrical shape, each row being interposed between said intermediate member and the adjacent structural member and rotary member, and two retaining members, each accommodating a row of rolling elements, said structural member, rotary member and intermediate member having substantially plane raceways at right angles to the bearing axis engaging the periphery of said rolling elements, said intermediate member and at least one of said retaining members being floatingly mounted with a substantial radial freedom relatively to said structural and rotary members, and centering means operatively interconnecting said intermediate member with that row of rolling elements, which is mounted in said floating retaining member, whereby the self-centering radial thrust produced in service by the rotation of said last-named row of rolling elements against the raceway of the adjacent member and which tends to center said row relatively to the bearing axis is transmitted to said intermediate member.

2. A thrust bearing as claimed in claim 1, wherein said centering means comprises a circular flange on said floating retaining member, surrounding said intermediate member with a slight clearance.

3. A thrust bearing member as claimed in claim 1, wherein said centering means comprises a circular flange on said intermediate member, surrounding said floating retaining member with a slight clearance.

4. A thrust bearing as claimed in claim 1, wherein said centering means comprises a circular flange rigidly connected with one of said floatingly mounted members and surrounding the outer periphery of the other floatingly mounted member, said flange having a channel shape facing the bearing axis for retaining lubricant under the action of centrifugal force.

5. A thrust bearing as claimed in claim 1, wherein both said retaining members are mounted floatingly, two centering means operatively interconnecting said intermediate member with the adjacent retaining members.

6. A thrust bearing comprising in combination a structural member, a rotary member, an intermediate member, two rows of radially arranged rolling elements of substantially cylindrical shape, each row being interposed between said intermediate member and the adjacent structural member and rotary member, and two retaining members, each accommodating a row of rolling elements, said structural member, rotary member and intermediate member having substantially plane raceways at right angles to the bearing axis engaging the periphery of said rolling elements, said intermediate member and one of said retaining members being floatingly mounted with a substantial radial freedom relatively to said structural and rotary members, centering means operatively interconnecting said intermediate member with that row of rolling elements, which is mounted in said floating retaining member, whereby the self-centering radial thrust produced in service by the rotation of said last-named row of rolling elements against the raceway of the adjacent member and which tends to center said row relatively to the bearing axis is transmitted to said intermediate member and a channel-shaped circular flange rigidly connected with said rotary member and surrounding with a small clearance the non-floatingly mounted retaining member.

References Cited in the file of this patent
UNITED STATES PATENTS
1,845,425    Larson et al.            Feb. 16, 1932

UNITED STATES PATENT OFFICE
CERTIFICATE OF CORRECTION

Patent No. 3,031,239          Dated April 24, 1962

Inventor(s) Alfred Pitner

It is certified that error appears in the above-identified patent and that said Letters Patent are hereby corrected as shown below:

In the heading, column 1, line 3, --of one-half interest-- should be inserted after "assignor".

SIGNED AND SEALED

OCT 27 1970

(SEAL)
Attest:

Edward M. Fletcher, Jr.
Attesting Officer

WILLIAM E. SCHUYLER, JR.
Commissioner of Patents